US008832860B2

(12) United States Patent
Temirov et al.

(10) Patent No.: US 8,832,860 B2
(45) Date of Patent: Sep. 9, 2014

(54) METHOD FOR MEASURING THE FORCE INTERACTION THAT IS CAUSED BY A SAMPLE (75) Inventors: Ruslan Temirov, Cologne (DE); Christian Weiss, Essen (DE); Frank Stefan Tautz, Bremen (DE)

(73) Assignee: Forschungszentrum Juelich GmbH, Juelich (DE)

( * ) Notice: Subject to any disclaimer, the term of this patent is extended or adjusted under 35 U.S.C. 154(b) by 0 days.

(21) Appl. No.: 13/390,623

(22) PCT Filed: Aug. 27, 2010

(86) PCT No.: PCT/DE2010/001004
§ 371 (c)(1),
(2), (4) Date: Mar. 1, 2012

(87) PCT Pub. No.: WO2011/026464
PCT Pub. Date: Mar. 10, 2011

(65) Prior Publication Data
US 2012/0151638 A1    Jun. 14, 2012

(30) Foreign Application Priority Data
Sep. 3, 2009   (DE) .......................... 10 2009 039840

(51) Int. Cl.
*G01Q 60/10*      (2010.01)
(52) U.S. Cl.
USPC ................................................ 850/26; 850/8
(58) Field of Classification Search
None
See application file for complete search history.

(56) References Cited

U.S. PATENT DOCUMENTS

| 5,025,153 | A | * | 6/1991 | Okada et al. | 850/1 |
|---|---|---|---|---|---|
| 5,185,572 | A | * | 2/1993 | Yagi et al. | 850/27 |
| 5,378,983 | A | * | 1/1995 | Yagi et al. | 850/27 |
| 5,436,448 | A | * | 7/1995 | Hosaka et al. | 850/1 |
| 5,744,799 | A | * | 4/1998 | Ohara | 850/3 |
| 5,793,743 | A | * | 8/1998 | Duerig et al. | 369/126 |
| 6,507,017 | B1 | * | 1/2003 | Naaman et al. | 250/234 |
| 7,114,378 | B1 | * | 10/2006 | Barth et al. | 73/105 |

(Continued)

FOREIGN PATENT DOCUMENTS

| EP | 1 712 893 | 10/2006 |
|---|---|---|
| GB | 2 267 761 | 12/1993 |

(Continued)

OTHER PUBLICATIONS

Temirov R et al: "A novel method achieving ultra-high geometrical resolution in scanning tunnelling microscopy", New Journal of Physics, Institute of Physics Publishing, Bristol, GB, vol. 10, No. 5, May 1, 2008, p. 53012, XP020137768, ISSN: 1367-2630 the whole document—figures 3, 4.

(Continued)

*Primary Examiner* — Andrew Smyth
(74) *Attorney, Agent, or Firm* — Jordan and Hamburg LLP (57) ABSTRACT

Disclosed is a method for measuring the force interaction caused by a sample, wherein a bias voltage, with respect to the sample, is applied between a tip, and the tip is guided at such a small distance to the sample that a measurable current flows between the tip and the sample, and a sensor and signal converter S, which changes the current flowing through the tip-sample contact depending on the intensity of the force interaction, is formed and used in the region of the force interaction. A scanning tunneling microscope therefor is disclosed.

21 Claims, 7 Drawing Sheets

(56) References Cited

U.S. PATENT DOCUMENTS

2003/0138657 A1 * 7/2003 Li et al. .................. 428/621
2009/0140137 A1 * 6/2009 Hiraoka et al. ............ 250/282
2010/0084276 A1 * 4/2010 Lindsay ..................... 205/93

FOREIGN PATENT DOCUMENTS

| GB | 2267761 A * | 12/1993 | ............ G01R 31/26 |
| WO | WO-2008/124706 | 10/2008 | |
| WO | WO 2008124706 A2 * | 10/2008 | ........... G01N 33/487 |
| WO | WO-2009/062631 | 5/2009 | |
| WO | WO 2009062631 A2 * | 5/2009 | ............ G01Q 60/10 |

OTHER PUBLICATIONS

W.H.A. Thijssen et al.: "Vibrationally Induced Two-Level Systems in Single-Molecule Junctions", Phys. Rev. Lett. 97, pp. 226806 (2006).
R.H.M. Smit et al.: "Measurement of the conductance of a hydrogen molecule", Nature 419, pp. 906-909 (2002).
A. Halibritter et al.: "Huge negative differential conductance in Au-H2 molecular nanojunctions", Phys. Rev. B 77, pp. 075402 (2008).

* cited by examiner

METHOD FOR MEASURING THE FORCE INTERACTION THAT IS CAUSED BY A SAMPLE

BACKGROUND OF THE INVENTION

The invention relates to a method for measuring the force interaction caused by a sample, in particular for a scanning tunneling microscope, and to a scanning tunneling microscope.

The scanning tunneling microscope (STM) and the operating principle thereof are generally known and understood. Because of special design features, the scanning tunneling microscope achieves lateral resolutions in the range of up to 0.1 angstrom and thus allows nanostructures to be visualized by way of the topography and/or local electronic density of states in the region of the valence electrons.

The atomic force microscope (AFM) utilizes the force interaction between a tip and a sample to map the sample surface. Contrary to the STM, a variety of fundamentally different types and operating modes exist with the AFM, which differ from each other in terms of the manner in which the force is detected. This variety reflects attempts to improve the resolution of the AFM into the range of atomic resolution, which has disadvantageously been extraordinarily difficult.

In all instances of atomic force microscopy, the force, or a variable derived therefrom, is used as the control variable for operating a feedback loop. The most common conventional operating modes are:
a) static AFM:
A tip, which is provided at the end of a soft bending beam in the form of what is known as a cantilever, is guided over the sample, with contact (contact mode), or in a contactless manner (non-contact mode), wherein the force of interaction is measured by way of the deflection of the cantilever. The common type of the static AFM is the bending beam AFM, usually with optical detection of cantilever deflection.
b) Tapping Mode:
This mode can be employed in different types. A tip oscillates over a surface and repeatedly comes in contact therewith.
c) Contactless Mode:
Here, the interaction between the tip and sample is measured without the two coming in contact with each other. The sensor is caused to oscillate often so as to prevent what is known as a jump to contact. This is then also referred to as a dynamic AFM. The dynamic AFM employs four different force sensors: cantilever, QPlus sensor, needle sensor and tuning fork, wherein these can be roughly divided into two categories depending on whether they are driven mechanically or electrically. What is measured is the frequency shift or amplitude shift of the force sensor. An important advantage of all the aforementioned AFM designs is the option of being able to conduct measurements without limitation, even on non-conducting samples.

Over the last few years, a wide variety of efforts have been made to improve the lateral resolution of the AFM toward (sub)atomic or submolecular resolution. Dynamic atomic force microscopy, which in comparison with the STM has the disadvantage of necessitating high apparatus-related costs, has so far been the most successful on this path.

A disadvantage of scanning tunneling microscopy is also the lack of chemical sensitivity, which is to say that STM does not allow chemical species to be identified, which means that, while molecular objects and surface structures in the lateral size range down to less than one angstrom can be imaged, they cannot be identified, chemically or otherwise.

In summary, the conventional STM offers lower experimental complexity than the high-resolution dynamic AFM, but has the disadvantage of providing no chemical information. The high-resolution dynamic AFM, in turn, offers more detailed information about the sample surface than the STM, including the chemical kind, but it has the disadvantage of being associated with greater experimental and apparatus-related cost.

SUMMARY OF THE INVENTION

It is therefore the object of the invention to provide a method for measuring the force interaction caused by a sample. A further object consists in providing a scanning tunneling microscope by which the force interaction caused by a sample can be measured.

The object is achieved by a method according to claim 1 and by a scanning tunneling microscope according to the additional independent claim. Advantageous embodiments will be apparent from the dependent claims.

The method is used to measure the force interaction caused by a sample. To this end, a bias voltage, with respect to the sample, is applied to the tip, and the tip is guided at such a small distance to the sample that a measurable current flows between the tip and the sample. During the method according to the invention, a sensor and signal converter S is formed in the region of the force interaction. The sensor and signal converter S changes the current flowing through the tip-sample contact depending on the intensity of the force interaction. The method is carried out in the direct vicinity of the sample or tip.

The sample and tip should preferably be electrically conducting, or at least semiconducting.

In one embodiment of the invention, this atomic force and scanning tunneling microscopy provides for a novel combination by reducing the sensor and signal converter S to nanoscopic dimensions and relocating it to the tip-sample contact, preferably of a scanning tunneling microscope. This combines certain advantages from both AFM and STM. Nanoscopic, for this purpose, shall mean essentially smaller than one nanometer.

It was found that, by nature, a nanoscopic sensor and signal converter S which can influence the force interaction to be measured is not sensitive to long-range ordered forces originating from the sample which disadvantageously make atomic resolution using macroscopic sensors, such as those which are used in the AFM, very difficult.

It was found that the current detection in the scanning tunneling microscope allows superior lateral resolution, and consequently signal conversion of the force interaction signal into a current signal, as early in the region of the tip-sample contact, is advantageous even in force microscopy. A tip according to the invention shall be understood to mean any element which represents a defined interaction center with respect to the force interaction with the sample, and in which the current flowing between the tip and sample concentrates when a voltage is applied.

The object is also achieved by designing the sensor S as a signal converter, which converts the force interaction signal into a current signal. This signal is then measured, for example, using conventional STM electronics. The sensor and signal converter S follows the changes in the force interaction which originate from the sample down into the (sub) atomic and intermolecular ranges of the binding forces. In the function as the signal converter, the sensor advantageously converts the changes that occur because of the atomic-geometric, chemical structure of the sample into measurable current signals.

If the method is repeated on laterally different positions of the sample, it is possible to compile force interaction maps. The atomic-geometric, chemical structures of the sample and/or intermolecular bonds are advantageously demonstrated in this way.

Because the sensor and signal converter S can be varied or influenced by the action of the force, this sensor and signal converter S can change the current through the tip-sample contact as a result of the change or influence. The change of a current flowing between a tip and a sample can be measured relatively easily, with excellent spatial resolution down to atomic dimensions. In contrast, the complexity of the mechanical measurement of force interactions according to the prior art, for example using an atomic force microscope, is considerably greater. By returning the force interaction to a change in the current through the tip-sample contact, according to the invention, the measurement thereof is also returned to the measurement of a current, and thus shifted into a domain in which a relatively simple instrument for measurements with high spatial resolution exists, such as the scanning tunneling microscope. In the method according to the invention, the sensor and signal converter S is thus not simply a sensor which records the force interaction, but also a true signal converter (transducer) which converts this change into a change in a current.

The sensor and signal converter S can be formed in situ in the tip-sample contact of an STM. The STM contains the means for measuring the current changed by the sensor S. It records the current at a point X, Y of the sample. The method can thus be repeated by scanning until entire force interaction maps of samples have been compiled based on the spatially resolved current. This forms the basis for imaging the atomic-geometric, chemical contrast and/or the intermolecular interaction of the sample.

Different signal conversion paths can be utilized. The signal conversion can be carried out, for example, by influencing the sensor and signal converter S under the action of the force, for example by elastic deformation, or by bracing, or by a change in the potential landscape, which leads to changes in, notably, the differential conductance of the tip-sample contact. This is advantageous because the differential conductance of a nano-contact is dependent on the properties of this contact with great sensitivity.

The tip-sample contact is not limited to an exponential relationship between current and distance. Likewise, the change in the conductance as a function of the force interaction can show arbitrary functional dependencies, which is to say functional dependencies different from exponential ones, depending on the design of the sensor and signal converter S. The tip-sample contact is also not limited to the tunneling regime. Other transport regimes, for example comprising a sensor contacted on both sides, which is to say toward the tip and sample, in which optionally a part of the current flows over the sensors, are possible.

The invention is moreover not limited to a scanning tunneling microscope. A system comprising the tip and sample within the meaning of the invention is also created, for example, in a break contact, in which the invention can be employed. A break contact shall be understood to mean the following: An electrically conducting or semiconducting structure is arranged on a pliable substrate, and this substrate is subsequently deflected out of the plane thereof. This creates an interface which becomes increasingly thinner as the deflection increases, and at which the structure ultimately tears into two parts that are electrically separated from each other. If the deflection is now reduced, a defined center of interaction of the one part continually moves closer to the other part until ultimately an electric current can flow again between the two parts. Both parts in general have a respective defined center of interaction, and the two centers of interaction approximate each other when the deflection is decreased. One part comprising a center of interaction is a tip within the meaning of the present invention, and the other part is the sample.

In a further embodiment of the invention, the sensor and signal converter S is adsorbed, condensed and/or resublimated in the tip-sample contact.

In an advantageous embodiment of the invention, the tip is guided to the sample in a scanning tunneling microscope (STM). In this instance, it is not only possible to control the distance between the tip and sample down into subatomic dimensions, but the tip can also be scanned laterally over the sample with comparable precision. It is thus possible not only to measure the force interaction in one location, but to capture the spatial distribution of this force interaction. This distribution can be represented in the form of an image, which contains the same type of information as an image recorded using an atomic force microscope (AFM), but with considerably lower apparatus-related cost, according to the invention. If, for example, the sensor S is guided so closely to the sample that the sensor reacts to the Pauli repulsion, images are obtained which render the atomic-geometric, chemical structure of the sample, or even intermolecular bonds, of a sample to be analyzed, with unprecedented resolution.

The invention thus, amongst others, falls into the field of maximum-resolution microscopy using scanning probe methods. The invention describes the method and a scanning tunneling microscope. The nanoscopic force interaction sensor, which also acts as a signal converter S, supplies force-microscopic images of molecular objects and atomic surface structures of other condensed objects with a resolution that is unprecedented in the STM. In this, the atomic-geometric, chemical contrast becomes clearly apparent. The sensor and signal converter S remains unchanged as a true contrast agent.

The method allows nanoscale objects to be identified based on the chemical, atomic-geometric structures thereof. The invention thus represents a new variant of force microscopy which can supply forces that can, in principle, be quantified.

In a further advantageous embodiment of the invention, the tip and the sample are arranged in a coplanar manner on a substrate. The tip can, for example, be guided to the sample by changing the deflection of the substrate out of the plane thereof. A coplanar arrangement of the tip and sample can, for example, be implemented in a break contact as described above. This embodiment allows the properties of the material of the structure to be studied particularly easily and quickly, if only the behavior of the material in as small a center of interaction as possible is to be studied, and the spatial distribution of this behavior is irrelevant.

In a particularly advantageous embodiment of the invention, a sensor and signal converter S is formed which carries at least a part of the current flowing between the tip and sample, and which has a conductance that can be varied by the force interaction. The conductance can, for example, be varied by changing the effective distance of the sensor to the sample. This can, for example, be implemented by selecting a sensor which can be deformed by the force interaction. The effective distance to the sample has a particularly strong influence on the current carried by the sensor when the current flowing between the tip and sample contains a component that is a quantum-mechanical tunneling current.

In a particularly advantageous embodiment of the invention, a sensor and a signal converter S is formed, the influence of which on the tunneling current in the tip-sample contact can be varied by the force interaction. This can, for example, be done by varying the position and/or the movement state of the sensor in the space between the tip and sample. For example, the position and the movement state of the sensor and signal converter S can change the electronic properties of the tip and/or electrode such that the tunneling probability for electrons between the tip and sample is changed.

In a particularly advantageous embodiment of the invention, a tunneling contact is therefore established between the tip and the sample. It is then advantageously possible to evaluate to what extent the dependency of the conductance on the distance between the tip and sample deviates from the exponential form. It was found that this deviation can essentially be attributed to the influence of the sensor and signal converter S on the current flowing through the tip-sample contact, which can be varied based on the force interaction. This current can notably contain a component which is proportional to the force interaction, or which follows another functional dependency.

In a particularly advantageous embodiment of the invention, the dependency of the current on the bias voltage is measured. It was recognized that the effect of a variation in the force interaction on the influence of the sensor and signal converter S on the current flow can be adjusted by way of the bias voltage. In a further advantageous embodiment of the invention, the effect of a variation in the force interaction on the influence of the sensor and signal converter S on the current flow is thus adjusted by way of the bias voltage. By varying the bias voltage, it is thus possible to electrically adjust the sensitivity of the sensor and signal converter S. This is comparable to the elastic properties of the bending beam (cantilever), at the end of which the tip is located, being continually variable electrically in an atomic force microscope (AFM). Atomic force microscopes according to the prior art do not offer such convenience. Instead, the bending beam, including the tip located thereon, must be completely replaced, which generally requires manual intervention, in particular when the microscope is in an ultrahigh vacuum. By varying the bias voltage, it is notably possible to determine the bias voltage at which those properties of the sample which are to be studied in the current analysis are particularly strongly pronounced.

This realization is also considered in the advantageous embodiment of the invention in which the effect of a variation of the force interaction on the influence of the sensor and signal converter S on the current flow is adjusted by way of the bias voltage. For example, it is possible to capture the spatial distribution of the force interaction and record it as an image by using the bias voltage that has proven to be most advantageous one for the present analysis utilizing the aforementioned embodiment.

The force interaction is advantageously measured after a maximum or a minimum in the negative differential conductance has been established in the current circuit which comprises the tip and sample, symmetrically around the bias voltage of zero for at least one bias voltage pair comprising a positive and a negative value. This has been found to be a reliable starting configuration, in which a change in the current flowing between the tip and sample due to the force interaction can generally be experimentally observed. Prior to measuring the force interaction, a bias voltage having a magnitude of approximately 100 mV or less is thus advantageously selected. During the measurement of the force interaction, a bias voltage having a magnitude of 40 mV or less, and more preferably having a magnitude of 10 mV or less, 5 mV or less, and more particularly less than 1 mV is preferably selected.

In a further advantageous embodiment of the invention, the current, the conductance and/or the differential conductance are measured as a function of the distance between the tip and the sample. Properties of the sample, or the manner in which the force interaction between the sensor and sample physically comes about, generally have influence on how the current, the conductance and/or the differential conductance depend on the distance between the tip and sample. So as to be able to reconstruct these properties or the manner of the force interaction, several of the aforementioned distance dependencies can notably be measured simultaneously.

In a particularly advantageous embodiment of the invention, a sensor and signal converter S is formed which comprises a molecule consisting of two atoms, preferably of the same element. For this purpose, in particular hydrogen (H or $H_2$) or deuterium (D or $D_2$) or helium or CO can be selected as the material for the sensor and signal converter S.

In a further particularly advantageous embodiment of the invention, the sensor and signal converter S comprises atoms or molecules having closed shells, because this can polarize the electrons in the tip and/or sample.

In a particularly advantageous embodiment of the invention, the sensor and signal converter S is formed at least partially of a gas which is conducted to the tip and/or to the sample while the same is cooler than the condensation, adsorption and/or resublimation temperature of the gas. This method can notably be employed when the tip is an integral part of a scanning tunneling microscope when carrying out the method. The microscope is generally in an ultrahigh vacuum. Prior to starting up the microscope, it is generally necessary to prepare both the sample and the tip with aggressive, material-ablating methods, which can remove a previously applied sensor. By then feeding a gas to the cold tip and/or sample, it is deposited there in liquid or solid form or is adsorbed there in the form of individual molecules or atoms. These deposits are used as the sensor and signal converter S for analyzing the sample. The sensor and signal converter S that is formed is thus a sensor which was produced in-situ after cleaning of the sample and tip and, contrary to conventional sensors, was thus not removed by this cleaning process. It is possible in particular for the gas to deposit in many areas on the tip and/or sample and to form the sensor and signal converter S in the tip-sample contact.

In a further particularly advantageous embodiment of the invention, a sensor and signal converter S is formed while the same is physisorbed on the tip and/or sample. There, it forms the sensor and signal converter S because it can respond with sensitivity to variations in the force interaction by varying the position thereof in the tip-sample contact, and because it can easily follow the tip during a lateral displacement of the tip with respect to the sample.

In a further advantageous embodiment of the invention, a sensor and signal converter S is formed which exhibits high compressibility in solid and/or liquid form, for example in that it undergoes strong zero-point vibrations because the movement state thereof then reacts sensitively to a change of the force interaction potential in front of the sample.

In a further particularly advantageous embodiment of the invention, a sensor and signal converter S is notably formed by a gas, the adsorption of which on the cold surfaces of the tip and sample is self-adjusting. This prevents excessively large coverage of the tip and/or sample with condensed or resublimated gas, which could disadvantageously affect the formation of an effective sensor and signal converter S.

In a particularly advantageous embodiment of the invention, the sensor and signal converter S has a well-defined adsorption spot in the tip-sample contact because a stable sensor and signal converter S can thus be formed.

Quantitative force measurement can be carried by means of the sensor and signal converter S by calibrating the sensor-signal converter system using a theoretical simulation. As an alternative, the sensor and signal converter S can be calibrated by the one-time use of a dynamic AFM. For this purpose, the sensor is placed at the tip of a dynamic AFM, which is used to simultaneously measure the tunneling current.

Combining a scanning tunneling microscope for detecting forces with the high spatial resolution inherent to the scanning tunneling microscope was advantageously accomplished, for the first time, with the invention.

The scanning tunneling microscope according to the invention comprises a tip to which a bias voltage, with respect to a sample to be analyzed, is applied and which can be guided at such a small distance to the sample that a current can flow between the tip and the sample. The scanning tunneling microscope advantageously comprises a sensor and signal converter S for a force interaction caused by a sample. The sensor and signal converter S changes at least a part of the current flowing through the tip-sample contact depending on the force interaction.

A scanning tunneling microscope according to the invention as such comprises the means for measuring the current as a function of the force interactions originating from the sample. However, the sensor and signal converter S for the first time allows detailed imaging of the atomic-geometric, chemical structure.

The microscope particularly advantageously has a lateral resolution of 0.01 nm or better. It also comprises means for transforming the X, Y data records of the current into images of the atomic-geometric, chemical contrast of the sample, as a function of the force interaction. It thus exhibits chemical sensitivity, which allows, for example, organic molecules to be distinguished from each other based on the atomic-geometric, chemical structures thereof. Moreover, intermolecular interactions can be rendered visible and analyzed.

For this purpose, the scanning tunneling microscope comprises a sensor and signal converter S, which is adsorbed, condensed and/or resublimated or physisorbed at the tip and/or the sample.

The subject matter of the invention will be described in more detail hereafter based on six figures, without thereby limiting the subject matter of the invention.

BRIEF DESCRIPTION OF THE DRAWINGS

Images a to c are shown together with the respective chemical formula.

d) a layer of PTCDA molecules on Au(111). The figure shows the molecular scaffold (black), including the oxygen atoms (gray circles). The arrows 1 to 6 identify regions displaying increased contrast. This contrast can be associated with hydrogen bonds to the proximal neighbors.

Imaging parameters:

a) 1.3×0.7 nm$^2$, constant distance, $V_b$=−5 mV, measured with $D_2$ as the sensor and signal converter S;

b) 1.5×0.6 nm$^2$, constant distance, $V_b$=−3 mV, $D_2$ as the sensor and signal converter S;

c) 1.5×1.5 nm$^2$, constant distance, $V_b$=−5 mV, measured with $H_2$ as the sensor and signal converter S;

d) 3.2×3.2 nm$^2$, constant distance, $V_b$=−10 mV, $D_2$ as the sensor and signal converter S. All images are shown as measured and are generated with the WSXM program.

a) switch between the conventional imaging of the LDOS and the atomic-geometric, chemical (STHM) contrast at low coverages of $D_2$ as the sensor and signal converter S;

b) to e) 64×64 pixels, 1.3×1.3 nm$^2$ dI/dV STHM images at constant distance, obtained from the spectroscopic data, measured by means of PTCDA/Au(111) with $D_2$ as the sensor and signal converter S. A dI/dV spectrum was recorded on every pixel of the image; for this purpose, lock-in technology (modulation amplitude 4 mV, frequency 4.8 kHz, recording time for one spectrum 1 s) was employed. The minimum (black circle) and maximum (white circle) of the differential conductivity, in units of the conductance quantum $G_0$, are shown in each image. Negative conductivity values are caused by sharp conductivity spikes.

f) dI/dV spectra measured at the points shown in b). The right side shows the spectra as they were measured. The left side shows the averaging over the light gray or dark gray circles (diameter 3 pixels~1 angstrom) in b). Sharp regions with noise beyond 20 mV are the conductivity spikes associated with the excitation of the $D_2$ molecule out of the contact.

a) dI/dV spectra measured at the center of PTCDA on Au(111) measured with $D_2$, at various distances between the tip and sample (increments 0.1 angstrom), recorded with lock-in detection (10 mV modulation, frequency 2.3 kHz). The regions containing gray rectangles highlight the conductivity spikes.

b) Differential conductivity measured at the center of PTCDA on Au(111) with $D_2$ with an approaching tip at a fixed bias voltage of −5 mV (gray line) and 120-130 mV (black line). Four measured spectra were averaged for the black line: dI/dv(−130 mV, z)+dI/dV(−120 mV, z)+dI/dV(120 mV, z)+dI/dv (130 mV, z))/4. Data points (black and gray points) were extracted from the regions shown hatched in a). The excess conductivity is calculated from the difference between the black and gray curves.

c) excess conductivity curves as in b), however here the tip is approximated to differing locations over the molecule. The positions are shown in the corresponding colors and by arrows in the sketch of the molecule.

d) atomic-geometric, chemical (STHM) images of PTCDA/Au(111) measured with $D_2$ at various distances, which are indicated by the triangles in c). Imaging parameters: 1.3× 1.3 nm$^2$, constant distance, $V_b$=−5 mV. IN conductivity scales (from black to white):
1) $5\times10^{-4}<G/G_0<3\times10^{-3}$,
2) $3\times10^{-5}<G/G_0<3\times10^{-3}$,
3) $5\times10^{-5}<G/G_0<5\times10^{-3}$,
4) $6\times10^{-5}<G/G_0<6\times10^{-3}$,
5) $7\times10^{-5}<G/G_0<7\times10^{-3}$,
6) $2\times10^{-4}<G/G_0<2\times10^{-2}$.

FIG. 6: shows a model structure and function of the sample-tip contact. The contact is made of a sharp stainless steel tip (see tip T in FIG. 6*a*, consisting of 6 circles) and the surface of the substrate SU (gray), on which an aromatic ring molecule (black) is adsorbed. In addition, $H_2$ or $D_2$ molecules (white circles) are formed within the contact, which is kept at a temperature of 5-10 K. In FIGS. 6 *b*) to *d*), these act as the sensor and signal converter S. The physisorption wells, in which $H_2$ or $D_2$ are bound, are represented by dark gray regions around the gas molecules. The z-dependency of the binding potential is shown on the right side of each contact, with basic states being indicated in black.

a) If the distance between the tip and sample is >10 angstrom, two molecules can be physisorbed separately on the tip and sample. The sample has a number of adsorption spots; one of these adsorption spots is in the center of a $C_6$ ring. A molecule will be adsorbed close to the apex on the tip. A1, A2 and B show equilibrium binding distances that add up to ≈10 angstrom. In such a configuration, the tunneling current is too small to be measured with our system.
b) For distances between 10 and 7 angstrom, the adsorption potentials of the tip and sample join to form a well which binds a single gas molecule. The contact is in the regime in which the conductivity is increased (Regime I in FIG. 5*b*).
c) The binding volume is smaller for distances between 7 angstrom and 6.5 angstrom. Due to the amplified Pauli repulsion, the electrodes (primarily the tip) are polarized and the density of states (DOS) thereof is locally reduced, which is indicated by the dark gray shadows in the tip.
d) Compared to c), the tip has moved to a point over the PTCDA on which higher electron density exists because of the C—C bond. The increased Pauli repulsion is shown in the electric potential diagram. This results in a stronger confinement and greater polarization of the tip, whereby the atomic-geometric, chemical (STHM) contrast is formed.
e) The sensor becomes unstable at distances between the tip and sample of <6.5 angstrom because the $H_2$ or $D_2$ molecule escapes from the contact.

DESCRIPTION OF THE PREFERRED EMBODIMENTS

The sensor and signal converter S is formed in-situ at the tip of a low-temperature STM. For this purpose, the method provided in WO 2009/062631 A2 can be employed, which is hereby incorporated in the present patent application by reference.

Production of the Sensor and Signal Converter S at the Tip-Sample Contact of the STM The following method yields the device of the scanning tunneling microscope according to the invention, the operation of which allows chemical, atomic-geometric resolution of samples. The device according to the invention is referred to as STHM (scanning tunneling hydrogen microscopy), as above and hereinafter.

In a low-temperature scanning tunneling microscope having a base temperature below the condensation temperature of the gas used, the tunneling tip is brought into tunneling contact with the surface of the sample by way of a coarse approximation of the microscope and is optionally pulled back for the following step by means of the z-piezoceramic.

Using a suitable device, preferably a capillary-like supply line, the gas is introduced directly into the tunneling contact, whereby it starts to condense on the cold surfaces of the sample or the tip until it finally, after a time $t_1$ after starting the gas supply, has changed the properties of the tunneling contact such that STHM images with chemical, atomic-geometric contrast can be recorded. After the a $t_1+\Delta$ (where $0\leq\Delta\ll t_1$), the supply of gas into the tunneling contact is ended.

In order to determine this time $t_1$, the following method is employed:
1) The tip is brought into tunneling contact with the surface by the z-piezoceramic at the set tunneling voltage U, until the tunneling current has reached the set target value I. The pair of values (U, I) defines a certain distance d of the tip from the sample (tunneling distance). This distance depends on the properties of the sample, the tip and the lateral position of the tip over the sample.
2) The feedback loop is opened.
3) Characteristic IU curves or dI/dU spectra in the range of approximately U=−100 mV to 100 mV are recorded at suitable time intervals of a few seconds to minutes at a constant tip distance. During this time, gas can continue to condense on the cold surfaces of the scanning tunneling microscope.

After the time $t_1$, the characteristic IU curve and the dI/dU spectrum change. This indicates a change in the tunneling contact. Typical characteristic curves and spectra before and after the change are shown at the top of in FIG. 2.

Reliable indicators of the state of the tunneling contact, which allows the atomic-geometric chemical contrast, are the sharp, downwardly directed peaks of the negative differential conductance, which appear in the dI/dU spectra in a symmetrically distributed manner around the tunneling voltage 0 mV. The tunneling voltages $U_{NDC}$ at which these occur vary between approximately 10 and 50 mV, and in rarer cases up to 100 mV and above. The peaks may also be directed upward for certain tunneling distances d.

After the characteristic IU curves and dI/dU spectra have been changed, STHM images can be recorded. For this purpose, the tip is scanned laterally over the sample at a low tunneling voltage U. Two operating modes of the STM may be used: the constant current mode and the constant height mode.

Figure 1:
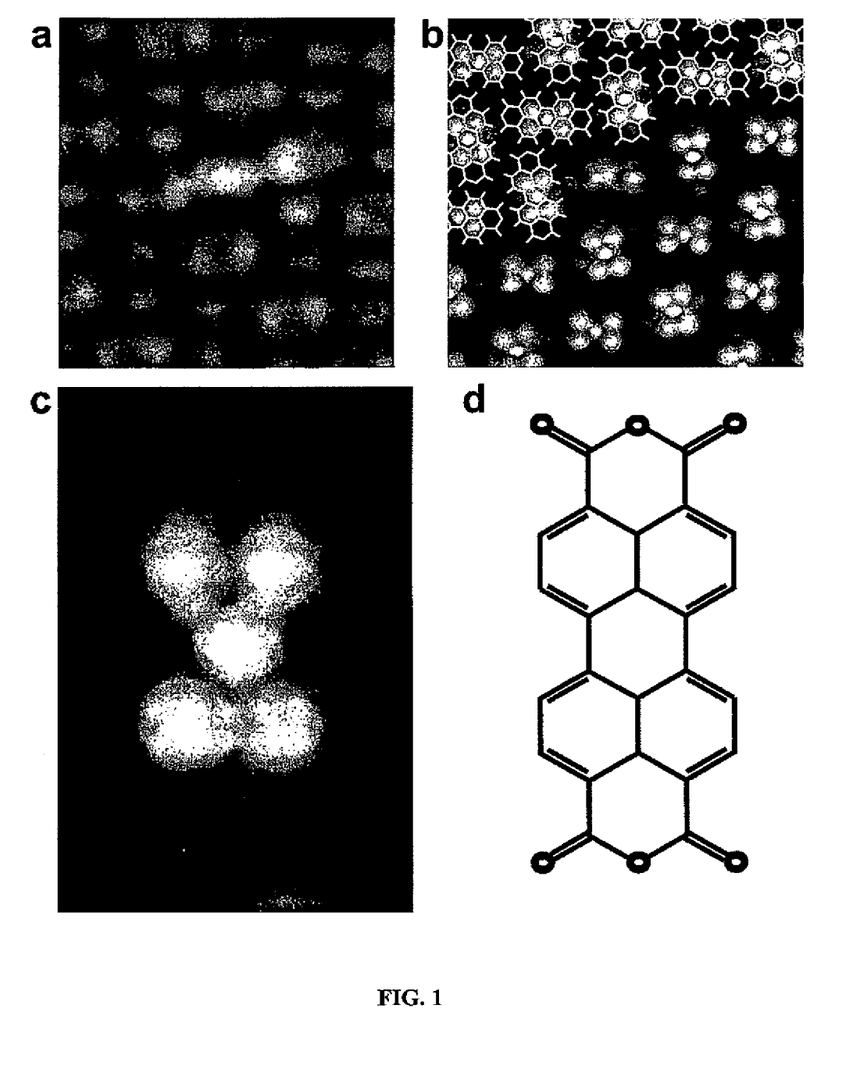
FIG. 1: shows a comparison between an image recorded using conventional STM (a) and the chemical-sensitive resolution method according to the invention (b, c) based on the example of a model molecule (d).

The STHM images with the atomic-geometric, chemical contrast show an improved contrast as compared to the conventional STM (see FIG. 1). In order to optimize the images, the tunneling voltage U and target current value I can be varied in the constant current mode, or the tunneling voltage U and tunneling distance d can be varied in the constant height mode, as is also customary with STM, so as to obtain an optimal imaging result for the respective sample and tip and the respective microscope. A further parameter by which images can be optimized is the geometry of the tunneling tip. The optimization of the STHM images can also further change the characteristic IU curves and the di/dU spectra.

Images can likewise be recorded with the atomic-geometric, chemical contrast, by way of using a method known as spectroscopic imaging of derivatives of the tunneling current I according to the tunneling voltage U.

If the chemical, atomic-geometric contrast of the STHM and characteristic IU curves and dI/dU spectra of the STHM are lost, the chemical, atomic-geometric STHM contrast, together with the characteristic IU curves and the dI/dU spectra of the STHM, can be restored within a period of seconds to minutes simply by continuing to scan the sample surface. If both do not return spontaneously, gas can again be metered into the tunneling contact as described above.

If the chemical, atomic-geometric STHM contrast is lost and the characteristic IU curves and dI/dU spectra of the STHM remain, the chemical, atomic-geometric STHM contrast can be regained by optimizing the tunneling tip geometry.

By varying the tunneling voltage U, it is possible to switch back and forth between the electronic STM contrast and the chemical, atomic-geometric STHM contrast any arbitrary number of times. Non-conventional images are observed with tunneling voltages U where $-|U_{NDC}|<U<|U_{NDC}|$ (range 2 in FIG. 2), wherein the clearest chemical, atomic-geometric STHM contrast is observed with tunneling voltages $U \approx 0$ where $|U| \ll |U_{NDC}|$.

In the range of $-|U_{NDC}|<U<|U_{NDC}|$ where $U \neq 0$ and $|U| \lesssim \approx |U_{NDC}|$, the images can contain extensive additional information about the sample surface.

Figure 2:
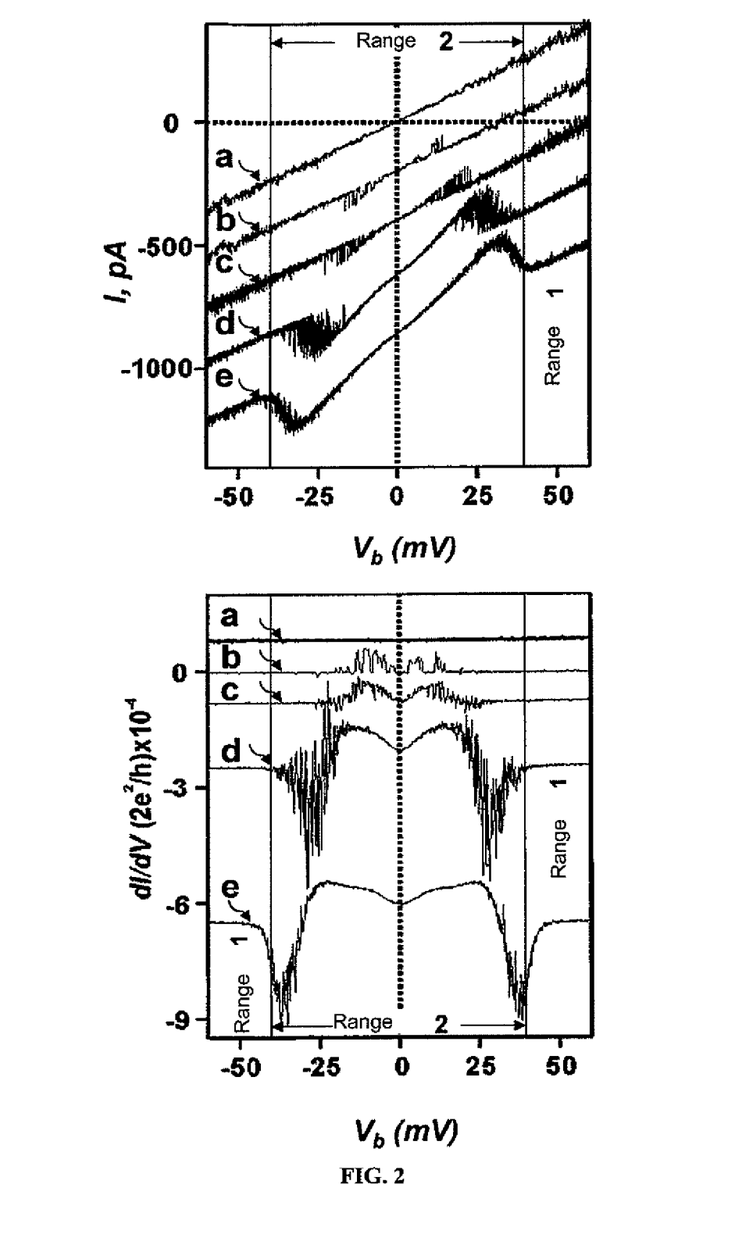
FIG. 2: shows the characteristic IU curve and differential conductance dI/dU for the imaging of a model molecule during the method according to the invention.

Conventional images of the electronic STM contrast are observed with tunneling voltages of $U<-|U_{NDC}|$ or $U>|U_{NDC}|$ (range 1, FIG. 2).

Switching the tunneling voltage U between ranges 1 and 2 allows for direct comparison of the chemical, atomic-geometric and electronic structures of the same sample surface. Images of the electronic and the chemical, atomic-geometric structures can also be recorded simultaneously by switching the tunneling voltage U between ranges 1 and 2 at every pixel.

The optimal dosage quantity of the gas that is used, which is to say the amount of substance to be supplied which results in the best chemical, atomic-geometric STHM contrast possible, depends on the microscope that is used, the metering device that is used, and the environment surrounding the two, for example any cooling shields that may be present, the (vacuum) chamber, and the like. These must be determined once, so as to then supply reliable results in further experiments using the respective set-up.

The values of the tunneling voltage U and of the tunneling current I (constant current mode), or of the tunneling voltage U and of the tunneling distance d, which are optimal for the atomic-geometric, chemical contrast, depend on the microscope, the tunneling tip and the sample. All values of U and I that allow conventional electronic STM images can be used as starting values for STHM. If optimized values are known for a certain combination comprising a microscope, tunneling tip and sample, scanning in the STHM mode according to the invention can be started directly with these values.

The results of FIG. 1 and FIG. 2 were obtained as follows: An ultrahigh vacuum low-temperature scanning tunneling microscope with $^4$He bath cryostats and two closed cooling shields was used. The outer shield was kept at 77 K, the inner one at 4.2 K in an ultrahigh vacuum chamber made by Createc.

The metering device comprises a gas inlet having a manually operated metering valve on the ultrahigh vacuum chamber, in which the cooling shields and the microscope are located. The tip is pulled back by means of the z-piezoceramic so that the gas valve can be actuated without causing a tip crash during actuation as a result of mechanical vibration. If it is ensured that the actuation of the valve does not result in any mechanical disruption, the tip can also be left in the tunneling contact during the following step.

During the metering process, the pumps on the ultrahigh vacuum chamber are switched off. The metering valve is opened far enough for the pressure measured in the ultrahigh vacuum chamber to rise to the value p. During the metering process, flaps measuring approximately 5 mm in diameter in the two cooling shields are opened, whereby the gas can flow to the microscope without impairment. Immediately after the time $t_1$, the metering valve is closed.

After the metering valve has been closed, the tunneling tip is moved into tunneling contact with the sample by means of the z-piezoceramic.

For FIG. 1, in particular, the following applies: $p=3 \times 10^{-8}$ mbar, $t_1=1$ min. The gas used was deuterium ($D_2$). The sample is PTCDA/Ag(111).

(a) $5 \times 5$ nm$^2$ constant current image with conventional electronic STM contrast, recorded at I=1 nA, U=−0.340 V.

(b) $5 \times 5$ nm$^2$ constant height dI/dV image of the sample surface from (a), recorded with the chemical, atomic-geometric STHM contrast mode. The image was recorded using deuterium ($D_2$). Before the image was recorded, the tunneling tip was brought into tunneling contact with the sample surface at a tunneling voltage of U=−0.010 V and a tunneling current I=1 nA. The tunneling voltage during the recording of the image was U=0 mV. The image was recorded using a lock-in amplifier (modulation amplitude 4 mV, modulation frequency 626 Hz). The calculated atomic structure of PTCDA/Ag(111) is shown in the top left corner.

(c) Enlarged detail from (b), $1 \times 1.5$ nm$^2$.

(d) Chemical formula of the imaged PTCDA molecules.

For FIG. 2, in particular the following applies:
$p=6.4 \times 10^{-9}$ mbar, $t_1=6.5$ h. The gas used was hydrogen ($H_2$). The sample is PTCDA/Ag(111). PTCDA is 3,4,9,10-perylenetetracarboxylic acid dianhydride.

The characteristic curves in the upper image section of FIG. 2 are shifted vertically downward on the Y axis by the following values: characteristic curve a=0 pA; characteristic curve b=200 pA; characteristic curve c=400 pA; characteristic curve d=600 pA; and characteristic curve e=800 pA. The dI/dU spectra, which are likewise offset, are shown in the lower image section of FIG. 1. Spectra b to e are shifted vertically downward on the Y axis. All the spectra b to e at bias voltages of less than −50 mV and more than +50 mV show the value of the unshifted spectrum a in an unshifted manner.

The top characteristic curve a and the top spectrum a were recorded before introducing the hydrogen. The characteristic curve b and the spectrum b were recorded at the time $t_1$ (see above). The characteristic curve c and the spectrum c were recorded at $t_1+22$ min. The characteristic curve d and the spectrum d were recorded at $t_1+80$ min. The characteristic curve e and the spectrum e were recorded at $t_1+14$ h. All curves were recorded centrally over a PTCDA molecule. The tunneling tip was stabilized at U=−0.340 V, I=0.1 nA before the spectra were measured.

2. Demonstrating the Force Sensor and Signal Converter S

As will be apparent from the data below, the effect of the sensor and signal converter S is also that of a contrast agent.

Figure 4:
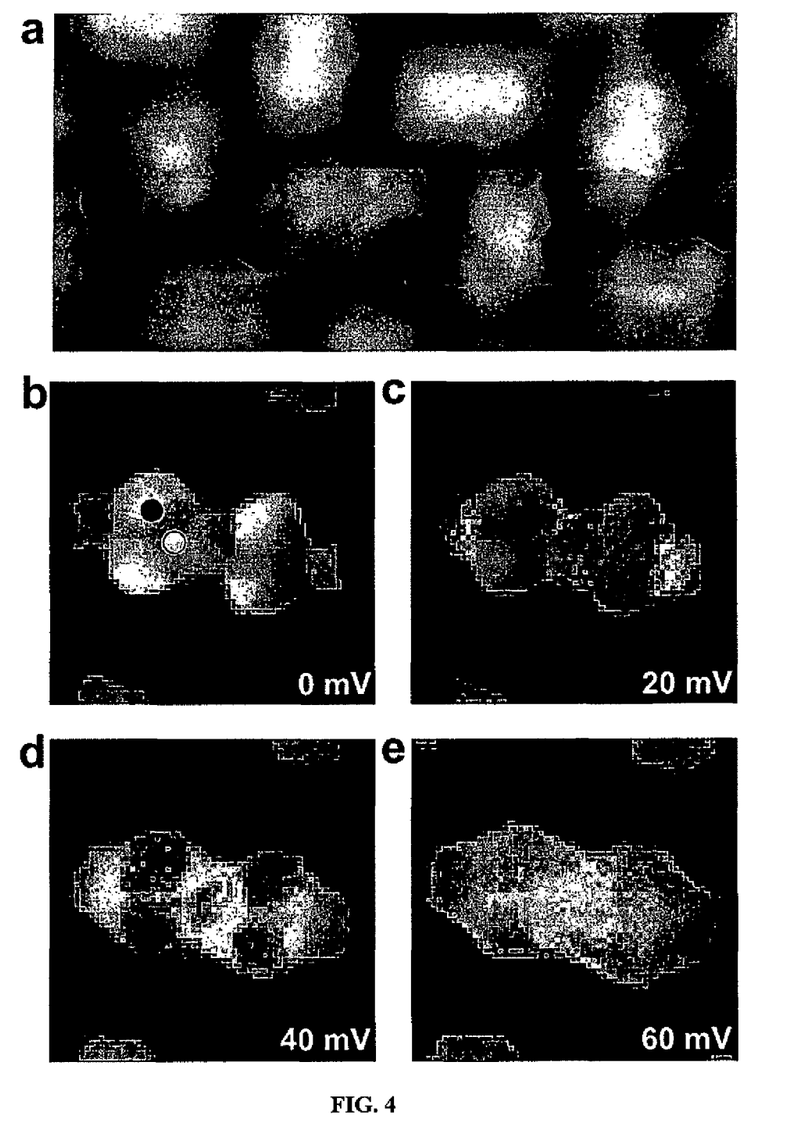
FIG. 4: shows the coverage and bias voltage dependencies of the atomic-geometric, chemical (STHM) contrast.

The method according to the invention is initiated, for example, by the condensation of molecular hydrogen ($H_2$) or deuterium ($D_2$) in the cold (for example <10K) tunnel junction of an ultrahigh vacuum STM. The adsorption of the gas abruptly changes the contrast during scanning (see FIG. 4a). With smaller coverages, these advantageous changes are unstable and the normal STM contrast is spontaneously restored after a short time. If the amount of gas on the surface is increased further, the changed contrast can be set for any arbitrary length of time.

Figure 3:
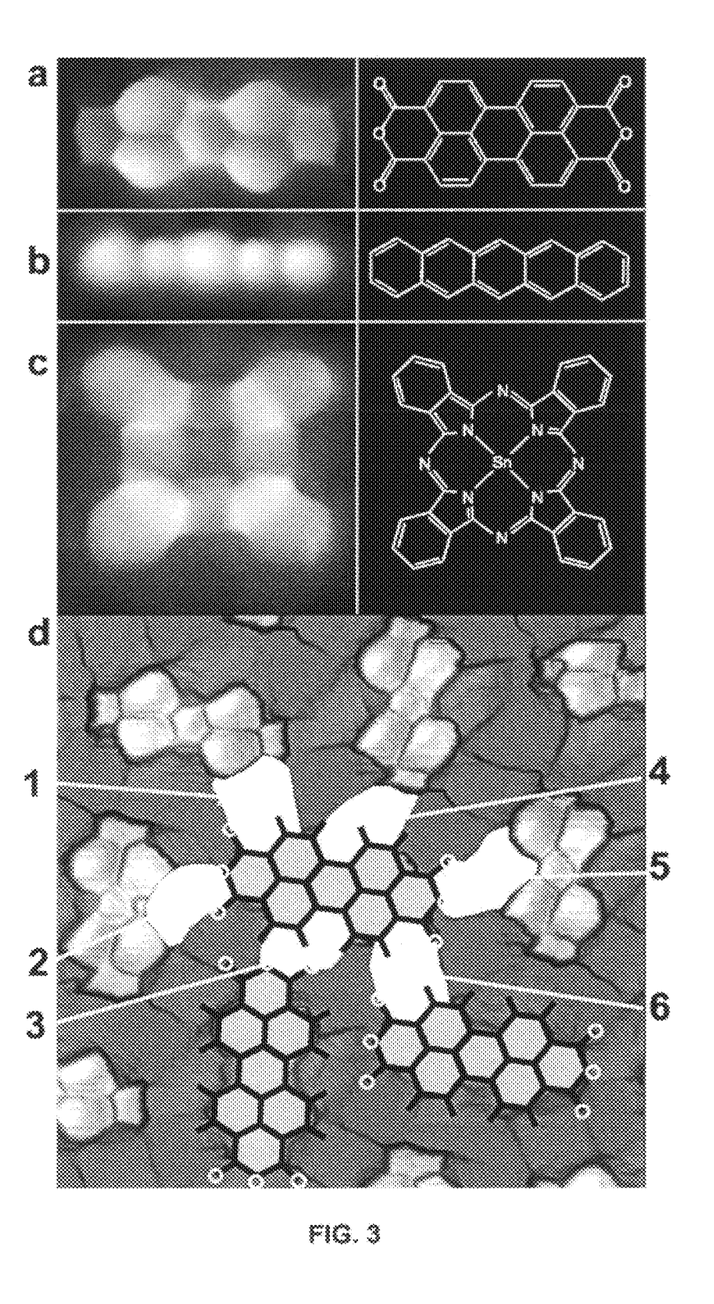
FIG. 3: shows chemical structures of organic adsorbates recorded by the method according to the invention and the atomic-geometric, chemical (STHM) contrast. STHM images of
a) 3,4,9,10-perylenetetracarboxylic acid dianhydride (PTCDA) adsorbed on Au(111),
b) pentacene/Ag(111),
c) Sn-phthalocyanine/Ag(111).

In the new STHM (scanning tunneling hydrogen microscopy) mode, complex organic molecules which were adsorbed on precious metal surfaces, and more particularly gold and silver (FIGS. 3 a to d) were analyzed. The contrast that was achieved corresponds to the chemical, atomic-geometric structure. FIG. 3d) additionally depicts the intermolecular bonds by means of STHM. The measurements in this mode are not sensitive to the local density of states (LDOS) which is normally represented with the STM. FIG. 3 shows the universal usability of the method according to the invention.

The spectroscopic characterization of the contact in the presence of the adsorbed gas, both as a function of the bias voltage (spectra having differential conductivity) and as a function of the tip-sample distance, is the key to understanding the atomic-geometric, chemical imaging mechanism. In order to determine whether certain features in the spectra of differential conductivity (dI/dU) are related to the STHM imaging mode, the dI/dU spectra were recorded with a static tip, which is to say a not laterally scanning tip, on a grid having 64×64 points over a single PTCDA molecule. Two typical spectra are shown in FIG. 4f). These show strong deviations from the linear I(U) behavior which are a characteristic feature of nanoscale contacts in the presence of $H_2$ or $D_2$; the specific appearance thereof is a fingerprint of the state of the contact. The dI/dV (X, Y, V) data cube, which was thus recorded, allows dI/dU images to be generated at any arbitrary bias voltage (see FIGS. 4b) to e)). Two things can be derived from FIG. 4: First, the atomic-geometric, chemical contrast that is generated by $H_2$ ($D_2$) is a lateral map of the differential conductivity of the tunneling contact at the bias voltage of zero (FIG. 4a)). Second, FIGS. 4b) to d) show that the atomic-geometric, chemical contrast disappears when a critical value of the tunneling voltage (approximately 40 mV in the present case) is exceeded; this value coincides with the position of the sharp, downwardly (or upwardly) directed peaks which appear in the dI/dU spectra in a symmetrically distributed manner around the tunneling voltage 0 mV. These sharp minima or maxima in the differential conductivity are referred to hereinafter in short as dI/dU spikes.

The data in FIG. 4 moreover conveys important information about the contrast itself. The fact that the static image in FIG. 4a) agrees with the scanned image at the top of FIG. 3a) proves that the corresponding imaging mechanism is based on a contact in the structural equilibrium. The atomic-geometric, chemical contrast is notably independent of the direction and speed of scanning. This demonstrates that all processes involved on the time scale of the experiment are fast. Moreover, FIG. 4f) shows that the state of equilibrium of the contact, as represented by the special appearance of the conductivity spectrum, changes from point to point on the sample.

The data results in the following picture. The gas adsorption changes the properties of the tip-sample contact such that the conductivity thereof reacts to the local atomic-geometric, chemical structure (contrary to the LDOS) of the sample. This is brought about by the formation of the sensor and signal converter S in the tip-sample contact. When the tip scans over the sample, the gas-modified contact, together with the sensor S contained therein, responds to lateral changes in the sample structure by changing the state of equilibrium. The contact thus "senses" the surface structure by way of the sensor S contained in the contact. The changed state of equilibrium changes the conductivity (for the bias voltage zero). During this process, information about the condition and composition of the sample is converted into a conductivity signal, which can be easily measured with the STM. The sensor thus also acts as a signal converter in the gas-modified contact.

Figure 5:
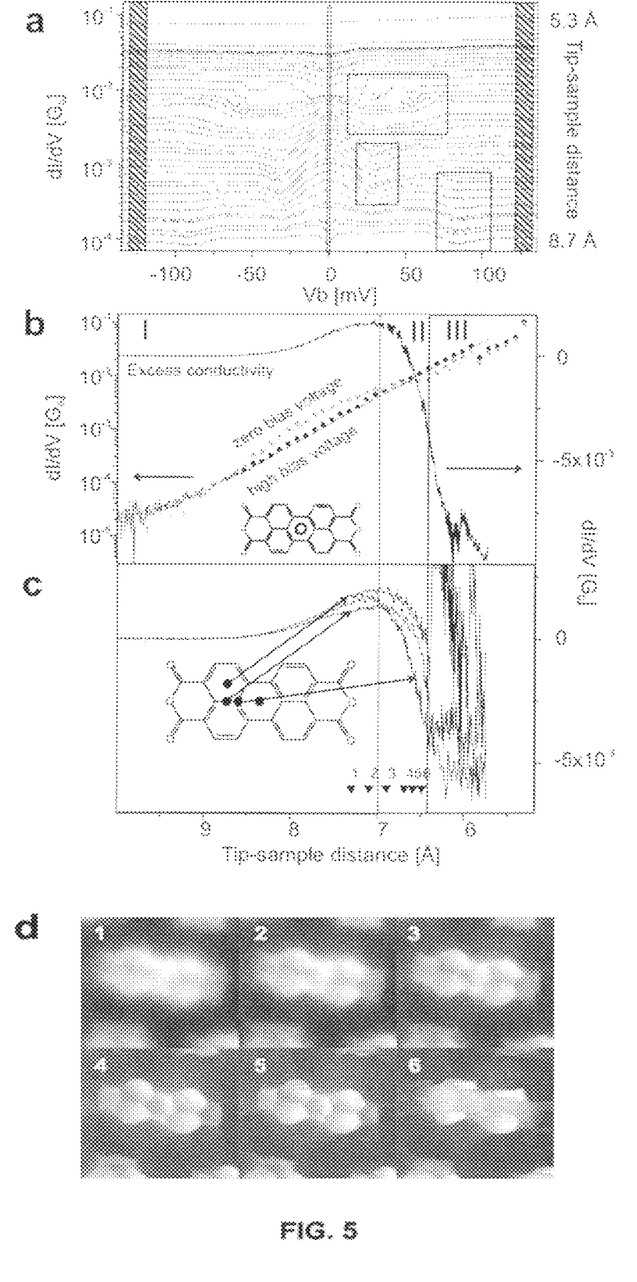
FIG. 5: shows the distance dependency of the conductivity of the contact and of the atomic-geometric, chemical (STHM) contrast.

So as to further analyze the properties of the sensor and signal converter S, the tip-sample contact, together with the sensor and signal converter S contained therein, is characterized by a series of dI/dU spectra recorded at various distances between the tip and sample (FIG. 5a)). This set of spectra can be used to generate approximation curves at a constant bias voltage (points in FIG. 5b)). Similarly, conductivity curves were recorded at a fixed bias voltage while the tip was approximating the sample (curves in FIG. 5b)). These approximation curves agree with those extracted from FIG. 5a). They do, however, contain more data points.

The spectra in FIG. 5a) show pronounced deviations from the linear I(U) behavior, which are already known from FIG. 4f). FIG. 5b) discloses that these non-linearities are associated with considerable deviations from the exponential behavior that is characteristic of a tunneling contact. In contrast, the spectra at voltages beyond the dI/dU spikes (the positions of the spikes change in FIG. 4a from ±40 mV and ±100 mV depending on the distance between the tip and sample) are flat, and the simple exponential dependency that is characteristic of the tunneling transport again appears in the corresponding distance curves. It is important that this reappearance of the exponential dependency happens simultaneously with the loss of the atomic-geometric, chemical contrast (FIGS. 4d) to e)). The dI/dU spikes thus reveal themselves as critical points at which the properties of the contact change decisively. In this context, it should be noted that it was found, in connection with hydrogen-containing nano-contacts, that the dI/dU spikes always occur when hydrogen molecules are excited by the current from well-defined bound states, inside the tip-sample contact, into a dense spectrum of weakly bound states outside of the tip-sample contact.

This illustrates why the atomic-geometric, chemical contrast has to disappear. At the dI/dU spikes, the hydrogen, or alternatively deuterium or another suitable molecule, is excited out of the contact, and an empty contact naturally once again exhibits simple tunneling characteristics and conventional LDOS images.

The non-exponential behavior in FIG. 5b is the key to atomic-geometric, chemical imaging. Utilizing the approximation curves in FIG. 5b), the effect of the adsorption of $H_2$ or $D_2$ can be quantitatively represented by subtracting the curve at the low bias voltage (0 mV) from that at the high bias voltage (averaging of 120 to 130 mV). The resulting excess conductivity curve provides an option to measure the amplitude of the abnormal behavior at the bias voltage zero which is associated with the STHM imaging mode. FIG. 5c) shows the excess conductivities for various points on a PTCDA molecule that is adsorbed on the sample. While each point supplies a certain and reproducible excess conductivity curve, two trends are present, which are always opposed to each other. The first one increases the excess conductivity as the tip-sample distance decreases, while the second one causes the opposite (which is to say, rising excess conductivity as the distance decreases). According to FIG. 5b), the first trend dominates with large distances (>7 angstrom), while the latter dominates with smaller ones (7-6.4 angstrom). The opposing behavior of the two trends results in a maximum of excess conductivity at 7 angstrom and allows three different regions to be defined (see FIG. 5b): regions I to III).

It has been shown that the excess conductivity curves completely characterize the system comprising the tip-sample contact, together with the sensor and signal converter S contained therein, which supplies the chemical, atomic-geometric contrast. They further contain the key to understanding the operating principle of the sensor and signal converter S.

Hydrogen and deuterium, used as the sensor and signal converter S, are physisorbed in the monolayer and multilayer. On flat surfaces, the multilayer desorption temperature of $D_2$ is 8K, while no more than two layers of $H_2$ can be adsorbed at a temperature of 4.2K. This means that the $H_2$ or $D_2$ coverage of the tip and sample is self-limiting to a few layers in the experiments shown. The disappearance of hydrogen-induced features in the spectra at 20±5 K is potentially caused by the capillarity in the contact between the tip and sample.

With tip-sample distances of <10 angstrom (estimated based on the experiments), the tip-sample contact thus offers room for only one layer of gas molecules, because the typical adsorption distance of hydrogen is 3.2 angstrom and the intermolecular distance in the solid hydrogen body is 3.3 angstrom. The high lateral resolution of the images, which is shown in FIG. 3, moreover suggests that the imaging is generated by a single $H_2$ ($D_2$) molecule which is located at the tip atom at the very front in a relatively stable manner. This assumption is confirmed by (i) the increased binding activity of gold adatoms with respect to $D_2$, (ii) the dI/dU spikes, which are only expected if the $H_2$ or $D_2$ molecule has a stable and unambiguous adsorption structure inside the contact, and (iii) the reproducibility and stability of the atomic-geometric, chemical imaging mechanism itself.

The atomic-geometric, chemical imaging mode occurs even with relatively small gas coverages as soon as a molecule is trapped inside the contact. This can indeed be observed (see FIG. 4a), wherein FIG. 4a also shows that the molecule can spontaneously disappear from the contact during the scanning of the sample.

The experiments demonstrate that the atomic-geometric, chemical imaging mode becomes more stable with higher coverages, either due to a higher frequency at which $H_2$ or $D_2$ molecules are trapped in the contact and/or due to an additional limiting potential which is exerted on the central $H_2$ or $D_2$ molecule by $H_2$ ($D_2$) molecules neighboring the contact. Such influence of neighboring $H_2$ or $D_2$ molecules on the changes of the dI/dU spikes as a function of the time during which the sample is exposed to the gas, even if the atomic-geometric contrast has already been established, can indeed be observed (FIG. 2).

The regime of the atomic-geometric, chemical contrast must be clearly distinguished from the imaging of densely packed monolayers of condensed $H_2$ or $D_2$ itself, because in the present example the images under discussion never included images of $H_2$ or $D_2$ layers. Based on this, it can be concluded that all experiments presented were carried out with sub-monolayer coverages of mobile $H_2$ ($D_2$) molecules.

The following image of the tip-sample contact after introducing the gas is the result of the above description of the adsorption properties of $H_2$ or $D_2$ or other sensor materials. Both the tip and the sample bind gas molecules in the respective physisorption minimum (see FIG. 6). Because the adsorption at the tip, which is represented by 6 circles, takes place in the vicinity of the tip atom at the very front, the adsorption potential of the tip can be considered to be a substantially rotationally symmetrical well. The sample likewise provides a large number of adsorption spots. In the case of the aromatic molecules in FIG. 3, a group of such spots is located, for example, in the centers of the respective $C_6$ rings. The potential at these spots can likewise be considered to be a substantially rotationally symmetrical well, which can also receive a single gas molecule. The potential wells on the tip and sample fuse when the sample is scanned at an appropriate distance between the sample and tip (see FIG. 6b). The resulting potential can accommodate only a single molecule between the tip and sample.

Figure 6:
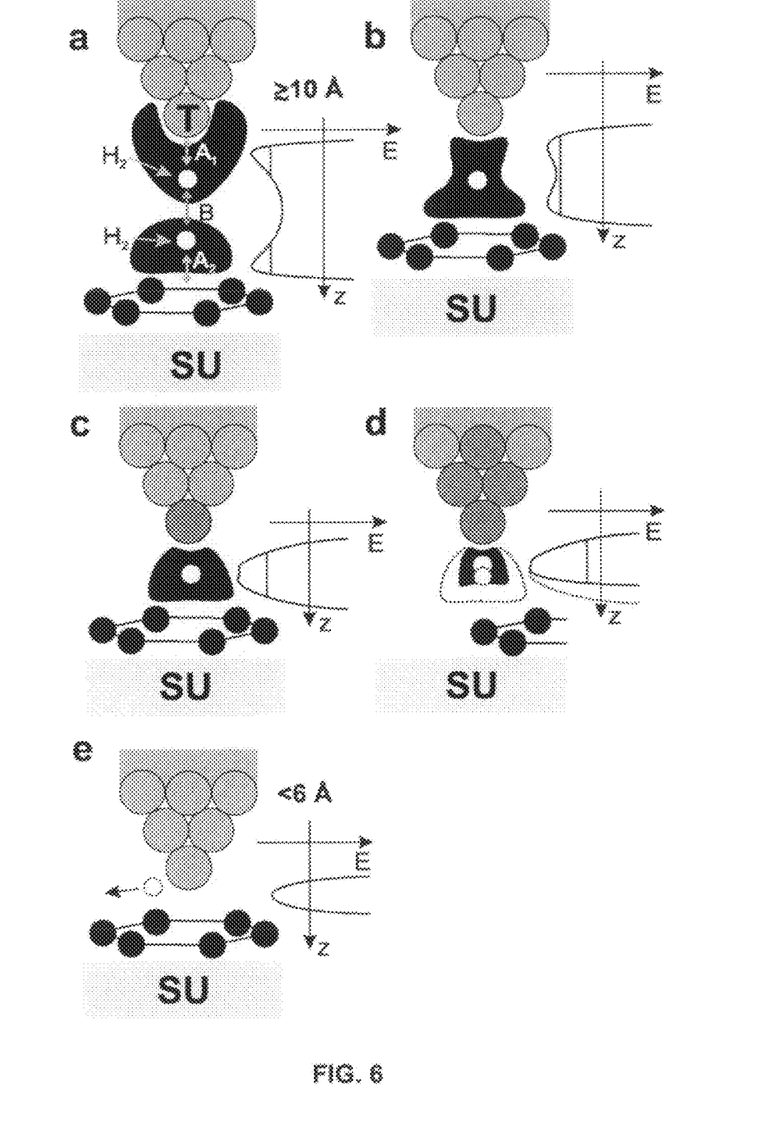

It is thus clear that a single $H_2$ or $D_2$ molecule in the combined potential well is the sensor and signal converter S, which is responsible for the atomic-geometric, chemical imaging mode. In order to understand the operating principle of this sensor and signal converter S, the excess conductivity from FIG. 5b) and the origins of the aforementioned three regimes will be discussed. The sudden and non-reproducible change in the excess conductivity in regime III has its origin in the mechanical displacement of the molecule from the contact. This may be accompanied by a structural change of the electrodes (which is to say the tip and sample) (FIG. 6e)). The gas molecule is increasingly confined between the electrodes directly before the forced exit from the tip-sample contact (see FIG. 6c)). This is done in regime II. In condensed form, $H_2$ and $D_2$ exhibit high compressibility because of the high zero-point energy (ZPM) thereof. Similarly high "compressibility" is to be expected for the single module of the sensor and signal converter S in the tip-sample contact. When in regime III the $H_2$ or $D_2$ molecule escapes from the contact, the zero-point energy thereof is large enough to overcome the lateral boundary of the potential well. During the compression in regime II, the zero-point energy ZPM of the trapped molecule steadily increases because of the Pauli repulsion of the trapped molecule from the tip and sample. The Pauli repulsion between a molecule or atom having a closed electron shell and a metal surface decreases the local density of states in a small energy range around the Fermi energy (see FIGS. 6c/d). The effect increases the stronger the Pauli repulsion is. Because of the reduced density of states in the tip, and optionally in the sample, the effect causes a decrease in the conductivity of the tip-sample contact (FIGS. 6c/d)).

The increase in the excess conductivity in regime I of FIG. 5 b) can likewise be explained by a change in the potential well in which the sensor and signal converter S is bound. Regime I starts with large distances between the sample and the tip when both can bind a respective $H_2$ or $D_2$ molecule (see FIG. 6a)). In the early stage of the fusion of the two potential wells, a characteristic double-well potential forms along the z-direction. In this potential, a single $H_2$ or $D_2$ molecule can leap from one local minimum to another. It is conceivable that this movement couples to the electron flow, whereby the conductivity of the tip-sample contact is increased.

Based on FIG. 5d), which shows a sequence of six images recorded with decreasing distances between the sample and tip, the atomic-geometric, chemical contrast can be clearly associated with the regime of rising Pauli repulsion (regime II). The figure clearly shows that the maximum resolution in the atomic-geometric, chemical contrast is reached directly before the transition from regime II to regime III. Consequently, the repulsive interaction between the sensor and signal converter S and the sample forms the basis for the atomic-geometric, chemical contrast.

The mechanism of the atomic-geometric, chemical contrast formation is also schematically shown in FIGS. 6c) to d) for a molecule adsorbed on the sample. When the tip is guided at a constant height over the sample from a point having lower electron density to a point having higher electron density, the Pauli repulsion increases because of the adsorbate (represented here in simplified form by a single benzene ring). Consequently, the wall of the potential well which faces the sample and in which the $H_2$ molecule is located becomes steeper, whereby the $H_2$ molecule is shifted closer to the tip. The $H_2$ molecule thus reacts as a sensor to the repulsive force of the adsorbate. If the $H_2$ molecule, as the sensor, now moves closer to the tip, the Pauli repulsion between $H_2$ and the tip rises, as a result of which the $H_2$ molecule now acts as a signal converter and as such reduces the electronic density of states in the tip by way of polarization. This leads to a decrease in the conductance in the tip-sample contact. The atomic-geometric, chemical contrast mode thus reacts to the overall electron density and can therefore be utilized to render the chemical structure of molecules or bonds between molecules visible.

In the above model, the atomic-geometric, chemical contrast arises as a modulation of the conventional LDOS contrast. If the tip is moved laterally over the sample at a constant distance to another point, it will find a different LDOS there, which leads to a changed conductivity of the tunneling contact. In FIG. 5b), this would lead to a shift of the exponential curve. At the same time, however, the potential of the sensor and signal converter S will also change. This results in a different excess conductivity than at the new point over the sample. As long as the change in excess conductivity is greater than the change in background conductivity induced by the LDOS, the tunneling image that is recorded will be dominated by the atomic-geometric, chemical contrast. In most cases that were analyzed here, the molecule-induced density of states in the range around the Fermi energy. As a result, only a low LDOS contrast is to be expected. On the other hand, a considerable molecule-inducted density of state exists at the Fermi level with PTCDA/AG(111). In this case, a superposition of the two contrasts (LDOS and atomic-geometric, chemical) is to be expected, which was indeed observed.

It was shown that, under suitable conditions (see paragraph 1 in Specific Description), the adsorption of molecular gases such as $H_2$ or $D_2$ in a tunneling contact results in the formation of a nanoscale sensor and signal converter S, which comprises a single molecule bound between the tip and sample. The sensor and signal converter S reacts to the lateral changes of the repulsive part of the adsorption potential of the sample. This signal is then converted into the conductivity signal by polarization of the local density of states close to the Fermi energy level.

The method according to the invention constitutes a new paradigm for S™ experiments. In conventional STM, at typical working distances (which are not excessively small), the tip is a passive element that measures the tunneling probability between its position and the sample.

Because the tunneling probability is proportional to the local density of states, information about the sample can thus be gained. In the novel method described here, the tunneling current between the passive metal tip and the sample still forms the basis for imaging. However, in addition, a resilient element is inserted in the tunneling contact. This element is selected so as to react to lateral changes of a sample property which, however, is not the LDOS. In the present example of atomic-geometric, chemical STHM, the local Pauli repulsion is the relevant sample property. However, in principle any other property may be selected. Because of its resilience, the sensor changes the conductivity of the contact by way of a suitable signal conversion mechanism. In the present case, this is done by polarization of the LDOS of the tip, however other conversion mechanisms are conceivable as well. It is conceivable for the "STHM Pauli repulsion microscopy" using physiorbed gas to be merely one example of a large class of new STM Methods.

The values stated with respect to distances, bias voltages and the like shall, of course, be understood to be merely exemplary and to be substantially dependent on the experiment itself.

As mentioned above, the sensor and signal converter S is used as a true contrast agent. The contrast agent acts passively, which is to say it is not bound to the sample.

The invention claimed is:

1. A method for measuring a force interaction caused by a sample in a scanning tunneling microscope, comprising:
    applying a bias voltage, with respect to the sample, to a tip of the scanning tunneling microscope;
    guiding the tip to within a small enough distance from the sample to achieve a tunneling contact with the sample so that a measurable current flows between the tip and the sample; and
    forming a sensor at the tunneling contact, wherein the sensor is self-adjusting and also serves as a signal converter, wherein the sensor changes the current flowing through the tunneling contact depending on an intensity of the force interaction, so that measurement of the current provides a measure of the force interaction caused by the sample.

2. A scanning tunneling microscope for analyzing a sample, comprising:
    a tip to which a bias voltage, with respect to the sample to be analyzed, is applied, wherein the tip can be guided to within a small enough distance from the sample to achieve a tunneling contact with the sample so that a current can flow between the tip and the sample; and
    a sensor serving as a signal converter, wherein the sensor changes the current flowing through the tunneling contact depending on an intensity of a force interaction between the sample and the tip; and
    means for evaluating the force interaction based on the current.

3. The scanning tunneling microscope according to claim 2, wherein the sensor is adsorbed, condensed and/or resublimated at the tip and/or the sample.

4. The scanning tunneling microscope according to claim 2, further comprising a capillary supply line extending directly into the tunneling contact.

5. The method of claim 1, wherein the tip and the sample are arranged in a coplanar manner on a substrate, wherein the tip is guided in a manner of either one or both of: changing deflection of the substrate out of a plane thereof; and being in a break contact to the sample.

6. The method of claim 1, wherein the formed sensor and signal converter carries at least a part of the current between the tip and sample, the conductance thereof being able to be varied by the force interaction between the tip and the sample, and wherein the conductance can be varied by changing effective distance of the sensor to the sample.

7. The method of claim 1, wherein the formed sensor and signal converter varies conductance of the tunneling contact as a function of the force interaction.

8. The method of claim 1, wherein at least one variable among a group of variables consisting of the current flowing between the tip and sample, a conductance of the tunneling contact, and a change in conductance of the tunneling contact is measured as a function of distance between the tip and the sample, and wherein an extent by which said at least one variable deviates from an exponential form is evaluated in order to measure the force interaction.

9. The method of claim 8, wherein a dependency on the bias voltage of said at least one variable is measured so that a change in the force interaction due to the sensor and signal converter current flow is adjusted by adjusting the bias voltage.

10. The method of claim 8, wherein a change in said at least one variable is measured as a difference of said at least one variable at differing bias voltages.

11. A method for measuring a force interaction caused by a sample in a scanning tunneling microscope, comprising:
   applying a bias voltage, with respect to the sample, to a tip of the scanning tunneling microscope;
   guiding the tip to within a small enough distance from the sample to achieve a tunneling contact with the sample so that a measurable current flows between the tip and the sample; and
   forming a sensor at the tunnel in contact, wherein the sensor is self-adjusting and also serves as a signal converter, wherein the sensor changes the current flowing through the tunneling contact depending on an intensity of the force interaction, so that measurement of the current provides a measure of the force interaction caused by the sample;
   wherein at east one variable among a group of variables consisting of the current flowing between the tip and sample, a conductance of the tunneling contact, and a change in conductance of the tunneling contact is measured as a function of distance between the tip and the sample, and wherein an extent by which said at least one variable deviates from an exponential form is evaluated in order to measure the force interaction; and
   wherein the force interaction is measured after a maximum or a minimum in the differential conductance has been established in a current circuit which comprises the tip and sample symmetrically around the bias voltage of zero, for at least one bias voltage pair comprising a positive and a negative value.

12. The method of claim 11, wherein prior to measuring the force interaction, a bias voltage having a magnitude of 100 mV or less is selected and/or that in the measurement of the force interaction, a bias voltage having a magnitude of 40 mV or less, and preferably having a magnitude of 10 mV, or 5 mV, or 1 mV or less is selected.

13. The method of claim 1, wherein the sensor and signal converter is formed at the tip and/or at the sample by adsorption, physisorption, condensation and/or resublimation.

14. The method of claim 13, wherein the formed sensor and signal converter comprises either one or both of: at least one molecule consisting of two atoms; and at least one atom or molecule having a closed shell.

15. The method of claim 13, wherein the formed sensor and signal converter has compressibility.

16. The method of claim 13, wherein the formed sensor and signal converter undergoes high zero-point vibrations.

17. The method of claim 13, wherein the formed sensor and signal converter comprises a light gas from among a group of light gasses including: hydrogen ($H_2$); deuterium ($D_2$); CO; and helium.

18. The method of claim 13, wherein the formed sensor and signal converter comprises a gas which is conducted to the tip and/or to the sample while the tip is colder than the condensation, adsorption and/or resublimation temperature of the gas.

19. The method of claim 13, wherein the sensor is a first sensor, and wherein at least one other sensor is formed, respectively, at laterally different positions of the sample, wherein each one of said at least one other sensor also serves as a signal converter, and wherein the first sensor and at least one other sensor are used for at least one use among a group of uses comprising: compiling a set of force interaction maps; determining atomic-geometric, chemical structures of the sample; and determining intermolecular bonds.

20. A method for measuring a force interaction caused by a sample in a scanning tunneling microscope, comprising:
   applying a bias voltage, with respect to the sample, to a tip of the scanning tunneling microscope;
   guiding the tip to within a small enough distance from the sample to achieve a tunneling contact with the sample so that a measurable current flows between the tip and the sample; and
   forming a sensor at the tunneling contact, wherein the sensor is self-adjusting and also serves as a signal converter, wherein the sensor changes the current flowing through the tunneling contact depending on an intensity of the force interaction so as to provide a measure indicative of the force interaction.

21. A scanning tunneling microscope for analyzing a sample, comprising:
   a tip to which a bias voltage, with respect to the sample to be analyzed, is applied, wherein the tip can be guided to within a small enough distance from the sample to achieve a tunneling contact with the sample so that a current can flow between the tip and the sample; and
   a sensor for providing a measure indicative of force interaction between the sample and the tip at the tunneling contact, the sensor comprising a signal converter material that changes the current flowing through the tunneling contact depending on an intensity of the force interaction between the sample and the tip.

* * * * *